United States Patent

Brun

[11] Patent Number: 5,382,361
[45] Date of Patent: Jan. 17, 1995

[54] LIQUID AND ENTRAINED AIR FILTER

[75] Inventor: Philippe Brun, Vineuil, France

[73] Assignee: Lucas Industries public limited company, West Midlands, England

[21] Appl. No.: 91,316

[22] Filed: Jul. 14, 1993

[30] Foreign Application Priority Data

Jul. 17, 1992 [FR] France .................. 92 08852

[51] Int. Cl.$^6$ .................................. B01D 35/01
[52] U.S. Cl. ........................ 210/436; 210/472; 210/497.01
[58] Field of Search ............ 55/306; 210/416.1, 416.4, 210/436, 437, 438, 457, 472, 493.1, 497.01

[56] References Cited

U.S. PATENT DOCUMENTS

| | | |
|---|---|---|
| 2,310,305 | 12/1937 | Miller et al. |
| 3,239,064 | 3/1966 | White .................. 210/416.4 |
| 3,695,443 | 10/1972 | Schmidt, Jr. ................ 210/457 |
| 3,701,424 | 10/1972 | Brown et al. |
| 4,602,605 | 7/1986 | Adkins .................. 123/516 |
| 4,684,463 | 8/1987 | Mizusawa .................. 210/416.4 |
| 4,828,698 | 5/1989 | Jewell et al. |
| 4,865,632 | 9/1989 | Yano et al. |
| 4,878,924 | 11/1989 | Yano et al. |
| 5,030,345 | 7/1991 | Thomas .................. 210/416.4 |

FOREIGN PATENT DOCUMENTS

| | | |
|---|---|---|
| 0342308 | 11/1989 | European Pat. Off. |
| 779197 | 3/1935 | France . |
| 1385489 | 12/1964 | France . |
| 1003557 | 9/1965 | United Kingdom . |

OTHER PUBLICATIONS

French Search Report And Annex.

*Primary Examiner*—Robert A. Dawson
*Assistant Examiner*—W. L. Walker
*Attorney, Agent, or Firm*—Trexler, Bushnell, Giangiorgi & Blackstone, Ltd.

[57] ABSTRACT

A filter element for liquids has an outer casing within which is located a central tube. A filter medium is located between the casing and the tube. Liquid enters the medium through apertures in an upper end plate and the filtered liquid leaves the medium by way of apertures in a lower end plate. Mounted in the lower portion of the central tube is a further tube through which the filtered liquid can flow into the upper portion of the central tube. The upper end of the further tube is joined by a wall to the central tube and air which passes through the filter medium collects in a dead space defined between the tubes. An air bleed orifice formed in the wall allows the air to pass at a controlled rate into the filtered fuel flowing in the central tube.

3 Claims, 2 Drawing Sheets

LIQUID AND ENTRAINED AIR FILTER

The present invention relates to filters for liquids the filters being of the kind which are inserted between a reservoir and an induction pump.

A liquid flow takes place through the filter upon induction by the pump, the pressure between the pump and the filter being less than the pressure between the reservoir and the filter.

The filtering element which forms the essential component of the filter, is constituted by a filtering medium usually paper, which operates to prevent particles which may be in suspension in the liquid in the reservoir, from damaging the induction pump.

Gases and air from the reservoir circulate with the liquid in variable proportions and appear in the form of bubbles or as an emulsion. The intrinsic characteristics of the filtering medium, amongst others the size of its pores, the nature of the liquid, its viscosity, and its flow rate, are some parameters which affect the loss of pressure head in the region of the filter medium. The air or the gases are liable to be stopped by the filtering medium, whether the liquid is flowing or whether it is stopped and air pockets are formed which finally pass through the filtering medium following variations in the induction pressure of the pump. The sudden flow of air towards the pump may create difficulties in the pump during starting or in the use of the pump.

Different means exist to ensure permanent degassing of the liquid flowing through the filter.

Certain of these means provide for housing the filtering element in a casing of the filter assembly and for mounting on the liquid outlet tube a porous sleeve having a smaller pressure loss than that of the filtering medium of the filter element. The air is progressively evacuated by this sleeve, thus ensuring permanent degassing. However, these means partially bypass non-filtered liquid towards the filtered liquid, i.e. the filtrate.

In other means, having a structure similar to that of the aforesaid means, a small orifice, protected by another filtering medium, in the filter assembly casing and connected to the outlet pipe, progressively evacuates the gases and ensures permanent degassing.

These two cited means partially by-pass non-filtered liquid towards the filtrate without passing through the filtering medium.

Another means known from French Patent Application No. 91.06726, ensures permanent degassing through orifices situated in zones of the filtering medium.

The invention aims to ensure permanent degassing without any means connected to the filtering element, such as sleeves or protected orifices, i.e. in as simple a manner as possible.

To this end, the invention provides a filter comprising a tube about which is located a filter medium through which the liquid to be filtered passes, the tube defining in part a dead space in which air entrained with the liquid to be filtered collects after it has passed through the filter medium and an air bleed orifice which communicates with said dead space and through which the air in said dead space can flow at a controlled rate into the liquid filtered by said filter medium.

The filtering medium may be made from one or a plurality of strips, for example of paper, wound together, and secured together at their upper and lower adjacent edges so that in section, the medium is of zig-zag configuration.

The orifices ensure permanent degassing of the liquid which passes through the filtering medium without the non-filtered liquid passing into the filtered liquid.

In a particular embodiment the central tube is defined by two concentric tubes of different lengths, one of them opening into the interior of the other, the dead space being constituted by the space between the two tubes and the degassing orifices being formed in one wall connecting the two concentric tubes.

In another embodiment the central tube is defined by two concentric tubes both opening outside the filtering element and degassing orifices are pierced in the wall of the inner tube, the dead space being delimited by the annular space between the internal wall of the one tube and the external wall of the other.

In another embodiment, the filtering medium is folded around the central tube in which degassing holes are pierced and the dead space is delimited by the wall of said tube and the surface defined by the ends of the folds of the filtering element.

The invention will be better understood from the accompanying drawings in which are shown different embodiments of the filtering medium elements.

Figure 1:
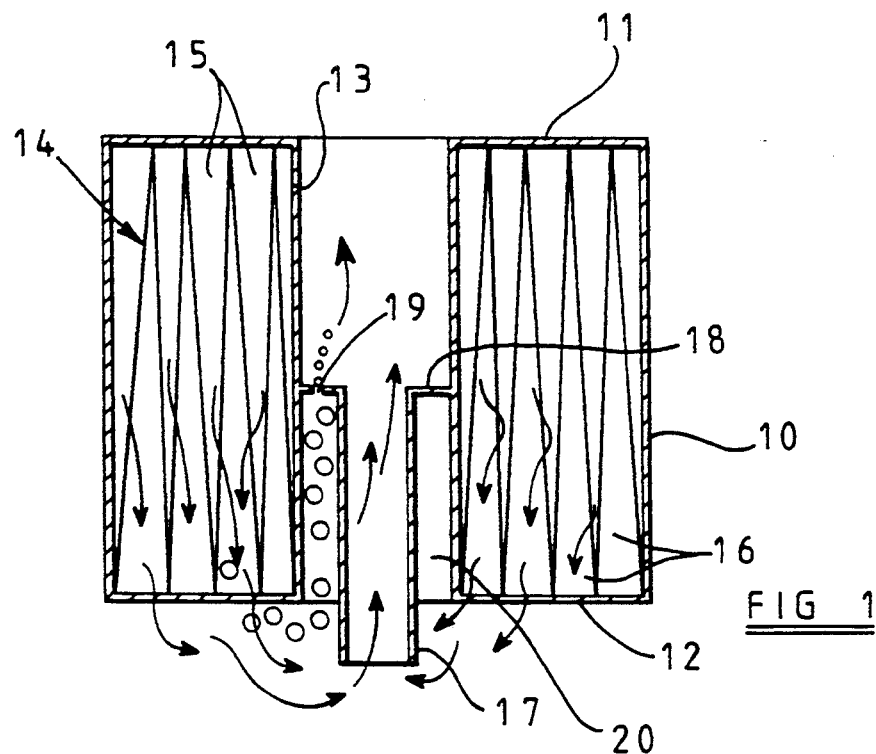
FIG. 1 is a sectional side elevation of one example of a filter element in accordance with the invention.

With reference to FIG. 1, the element comprises an outer casing 10 of hollow cylindrical form having at its opposite ends end plates 11, 12. One of the end plates may be formed integrally with the casing and the other end plate secured to tile casing by edge rolling once the filter medium as will be described, is located in position. Each end plate is provided with a central aperture between which extends a tube 13. The upper end plate 11 is provided with a series of inlet holes (not shown), through which liquid can enter the element and the lower end plate 12 is provided with a series of outlet holes or slots (not shown), through which liquid can leave the element.

Located in the annular space defined between the tube 13 and the inner surface of the casing is a filter medium 14 and in the example shown in FIG. 1 this comprises at least two lengths of filter paper which are wound about the tube 13. At their upper and lower edges the lengths of paper are secured together by adhesive so as to form a filtering medium which in section is of zig-zag configuration. The medium thus formed has inlet pockets 15 which are open to the Inlet holes formed in the plate 11 and outlet pockets 16 which are open to the outlet holes or slots formed in the end plate 12. The inner and outer turns of the medium are secured to the tube and the casing in a liquid tight manner by means of adhesive.

In the use of the element it is clamped between upper and lower housing parts not shown, which are secured together by means of a bolt which extends through the tube 13 so as to form a filter unit. The upper housing part defines a rim which seals against the upper edge of the casing 10 and a depending spigot which locates in sealing engagement with the internal surface of the tube 13. The housing part defines a liquid inlet connection which opens into a space above the upper end plate 11 and it also defines a liquid outlet connection which extends through the spigot and communicates with the interior of the tube 13. The lower housing part defines a rim which seals against the lower edge of the casing 10 and it defines a space or trough whereby liquid leaving the outlet holes in the end plate 12 can flow into the lower end of the tube 13 and into a further tube to be described.

As shown in FIG. 1 there is located within the lower portion of the tube 13, a further tube 17 which is of smaller diameter and which projects downwardly below the lower end of the tube 13. An annular partition wall 18 extends between the upper end of the tube 17 and the internal surface of the tube 13 and formed in the wall is a small air bleed orifice 19.

In use, the filter unit is interposed between a fuel reservoir and a fuel pump of a fuel system of an internal combustion engine. The fuel will contain entrained air and solid contaminant. The solid contaminant will be retained in the inlet pockets 15 and the air will tend to collect in the inlet pockets but will eventually pass through the filter paper into the outlet pockets and will be carried by the fuel flow through the outlet holes or slots in the lower plate 12. The air will tend to flow upwardly into the annular dead space 20 defined between the tubes 17 and 13 whereas the fuel will flow through the tube 17 into the tube 13. The air in the dead space 20 is allowed to leave the space in a controlled manner through the small orifice 19 as a steady stream of small bubbles whereas the air will tend to flow into the space as large bubbles which if they were allowed to flow to the pump, could upset the operation of the pump. The stream of small bubbles will not upset the operation of the pump.

Figure 2:
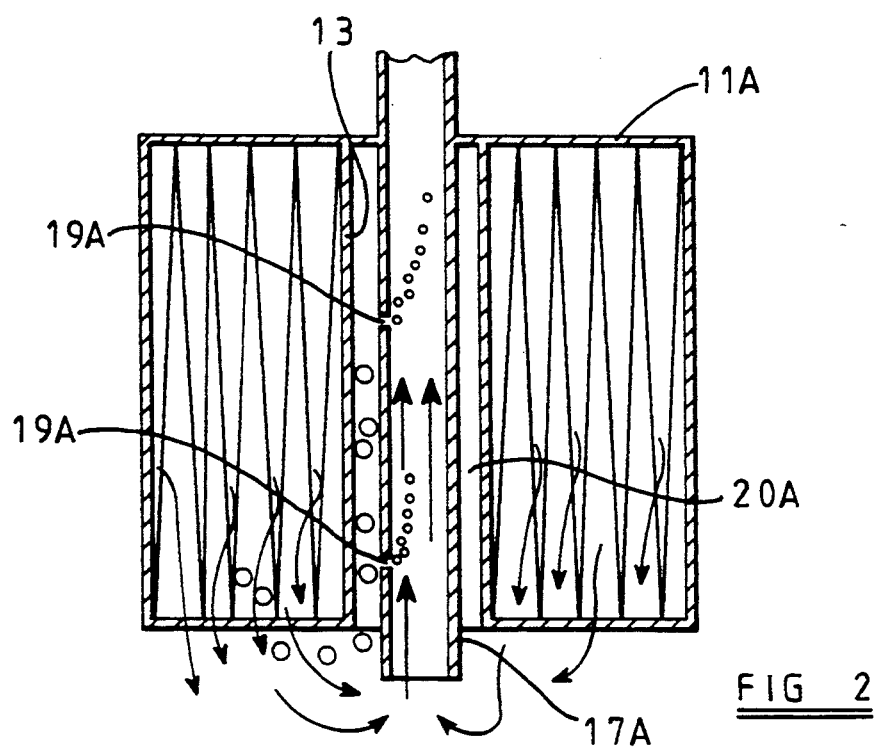
FIG. 2 shows a modification of the element shown in FIG. 1.

In the arrangement shown in FIG. 2 the apertured upper end plate 11A extends inwardly about the tube 17A so that the dead space 20A extends the full height of the element. The upper end of the tube 17A extends beyond the upper end of the plate 11A and in use communicates with the liquid outlet connection in the upper housing part. Moreover, the air bleed orifice or orifices 19A are formed in the wall of the tube 17A. Whilst it is envisaged that the tube 17A is part of the filter element it may be integral with the upper housing part. In this case the upper end plate 11A would be provided with an opening to allow the tube 17A to pass through. Liquid flows from the filter medium through apertures in the lower end plate 12A.

Figure 3:
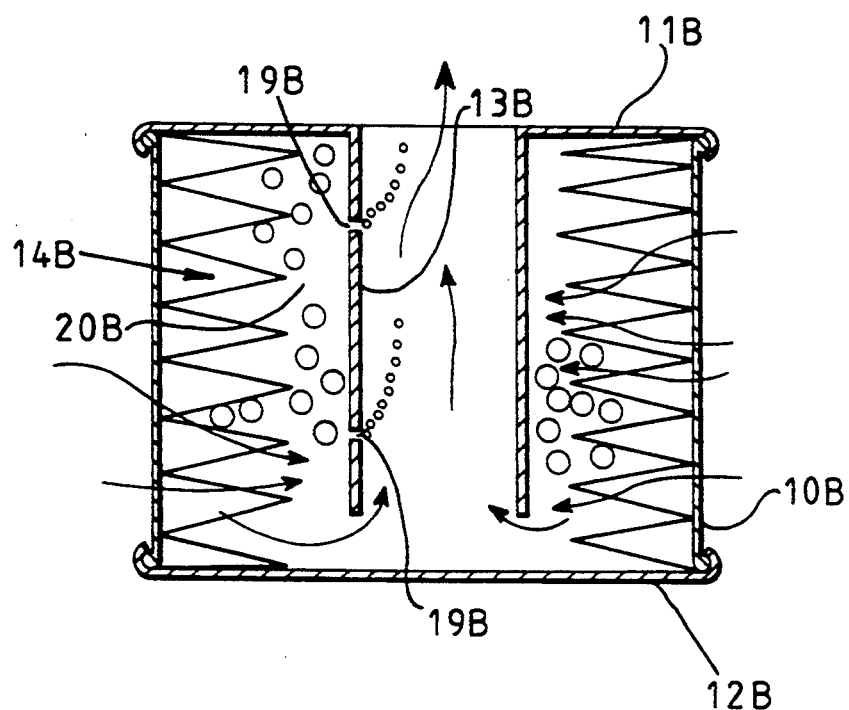
FIG. 3 shows another example of a filter element in accordance with the invention.

The filter element which is shown in FIG. 3 has an outer perforated casing 10B which is secured as by rolling, to upper and lower end plates 11B, 12B. The upper plate has a central aperture which opens into a central tube 13B the lower end of which is spaced from the end plate 12B. The end plates other than the central aperture in the upper plate are not provided with holes or slots. The filter medium 14B is of zig-zag configuration and comprises a tube of filter paper folded along its length and secured by adhesive to the end plates respectively. The inner folded edges of the filter medium are spaced from the periphery of the tube 13B so as to form a dead space 20B in which the air passing through the paper can collect and the air bleed orifices 19B are formed in the tube 13B. The fuel to be filtered flows through the apertures in the casing and the air which collects in the dead space 20B flows through the orifice as a steady stream of small bubbles.

I claim:

1. A filter element for liquids comprising a first imperforate tube about which is located a filter medium through which the liquid to be filtered passes, a second imperforate tube located within the first tube, said second tube receiving the filtered liquid from the filter medium, a dead space being defined between the first and second imperforate tubes in which air entrained with the liquid to be filtered collects after it has passed through the filter medium and an air bleed orifice which communicates with said dead space and through which the air in said dead space can flow at a controlled rate into the liquid filtered by said filter medium.

2. A filter element according to claim 1, in which the further tube extends downwardly below the first mentioned tube and the air bleed orifice is formed in a wall which interconnects the upper end of the further tube with the internal surface of the first mentioned tube at a position intermediate the ends of the first mentioned tube.

3. A filter element according to claim 1, in which the further tube extends beyond the opposite ends of the first mentioned tube and the air bleed orifice is formed in the wall of the further tube.

* * * * *